United States Patent [19] [11] 4,361,474

Shoaf et al. [45] Nov. 30, 1982

[54] ELECTROLYSIS CHAMBER FOR HYBRID FUEL SYSTEM

[76] Inventors: George Shoaf, 817 Wisteria Dr., Ephrata, Pa. 17522; David Pearson, 25200 Carlos Bee Apt. 409, Hayward, Calif. 94542

[21] Appl. No.: 224,205

[22] Filed: Jan. 12, 1981

[51] Int. Cl.³ .................. C25B 15/08; C25B 9/00; C25B 11/03; F02B 43/08
[52] U.S. Cl. .................. 204/239; 204/274; 204/278; 204/284; 204/290 R; 204/294; 123/DIG. 12; 123/3; 123/536
[58] Field of Search .............. 204/129, 266, 274, 278, 204/270, 290 R, 294, 237, 284; 123/DIG. 12, 3, 536, 538

[56] References Cited

U.S. PATENT DOCUMENTS

| | | | |
|---|---|---|---|
| 1,085,718 | 2/1914 | Buckley | 204/274 |
| 1,379,077 | 5/1921 | Blumenberg, Jr. | 204/278 X |
| 3,648,668 | 3/1972 | Pacheco | 204/129 UX |
| 4,023,545 | 5/1977 | Mosher et al. | 204/129 X |
| 4,031,865 | 6/1977 | Dufour | 123/DIG. 12 X |
| 4,233,132 | 11/1980 | Carr et al. | 204/129 X |
| 4,271,793 | 6/1981 | Valdespino | 123/DIG. 12 |

Primary Examiner—Donald R. Valentine
Attorney, Agent, or Firm—Blair, Brown & Kreten

[57] ABSTRACT

Disclosed herein is a hybrid fuel system for an engine which normally operates on fuel such as kerosene, gasoline, propane or the like and is adapted to be used in conjunction with the traditional fuel at selected times during the running of the engine. The system includes an electrolysis chamber provided with a fluid inlet and outlet, a pipe disposed within the chamber to allow the metered dispensing of a portion of the fluid contained within the pipe to an electrolysis area in such a manner that the dissociation of the fluid into its elemental components occurs quite readily. The configuration of the electrolysis area is such that remigration of the elemental components is extremely unlikely, and to this end an angled roof having faces which meet at an area above the pipe cause the elements to be separated and migrate on separate faces of the roof and thereafter to an opening which communicates with a conduit for admission of the elemental components into the engine. A cooling device is employed which utilizes a portion of the fluid not dispensed into the electrolysis area. Various controls and monitors are provided to assist in the selective deployment of the hybrid fuel system.

8 Claims, 11 Drawing Figures

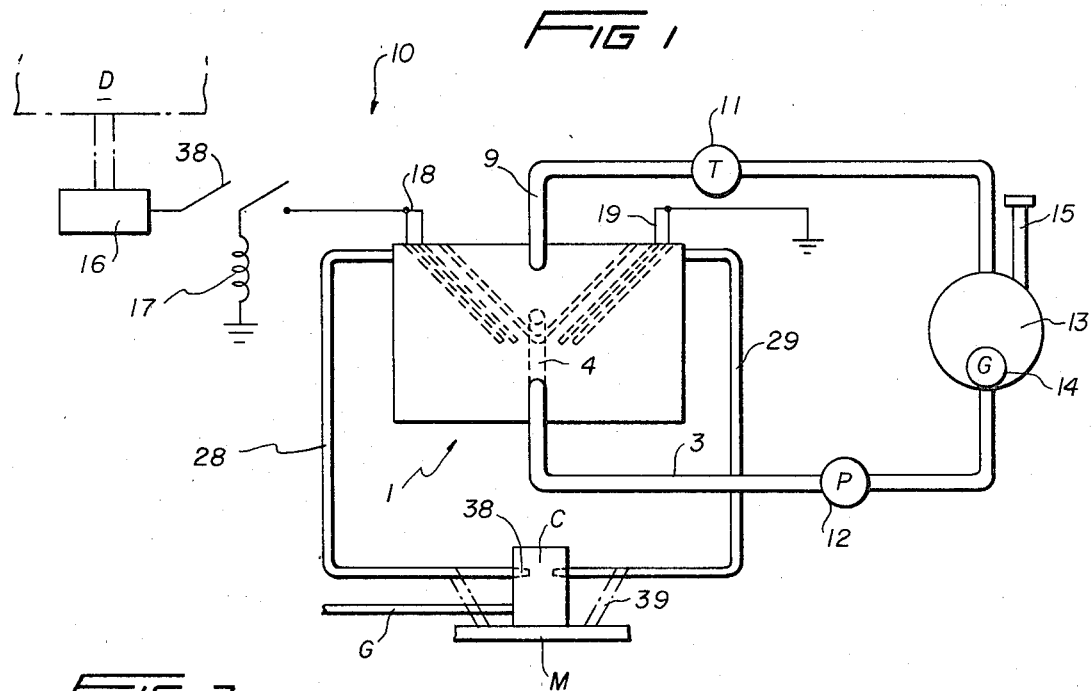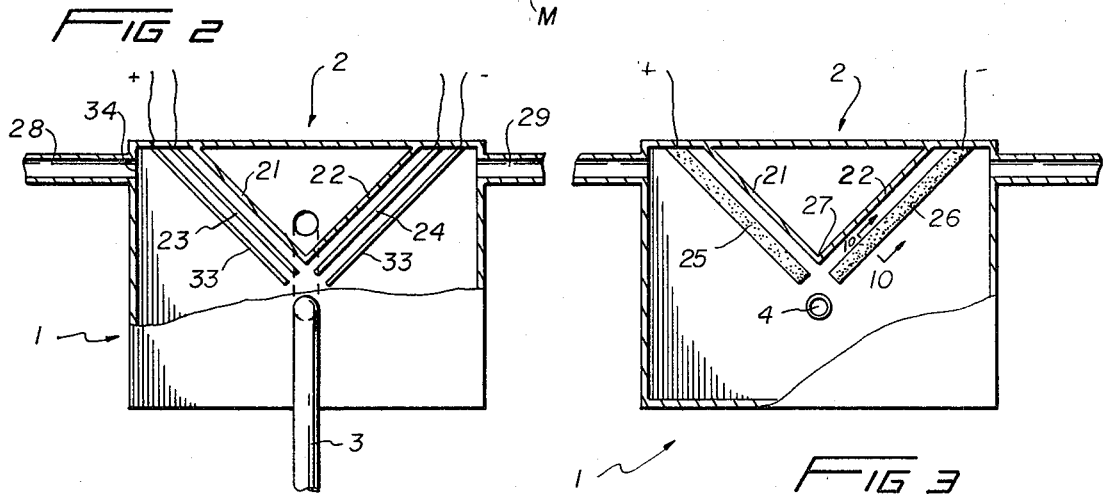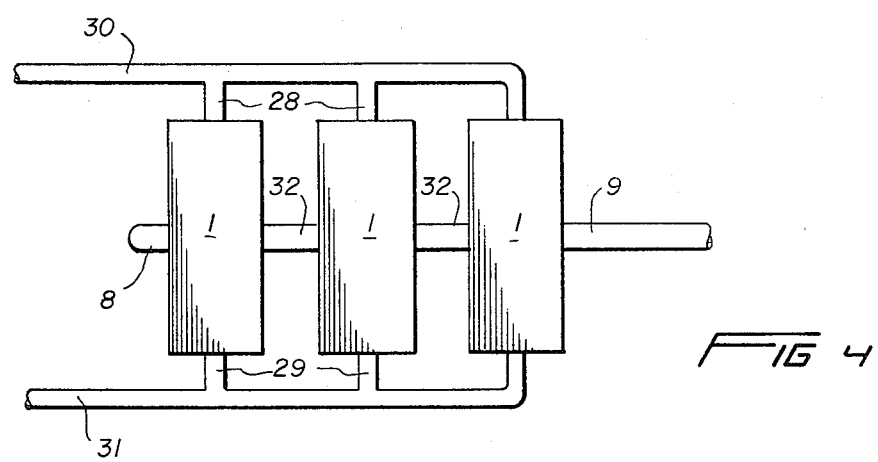

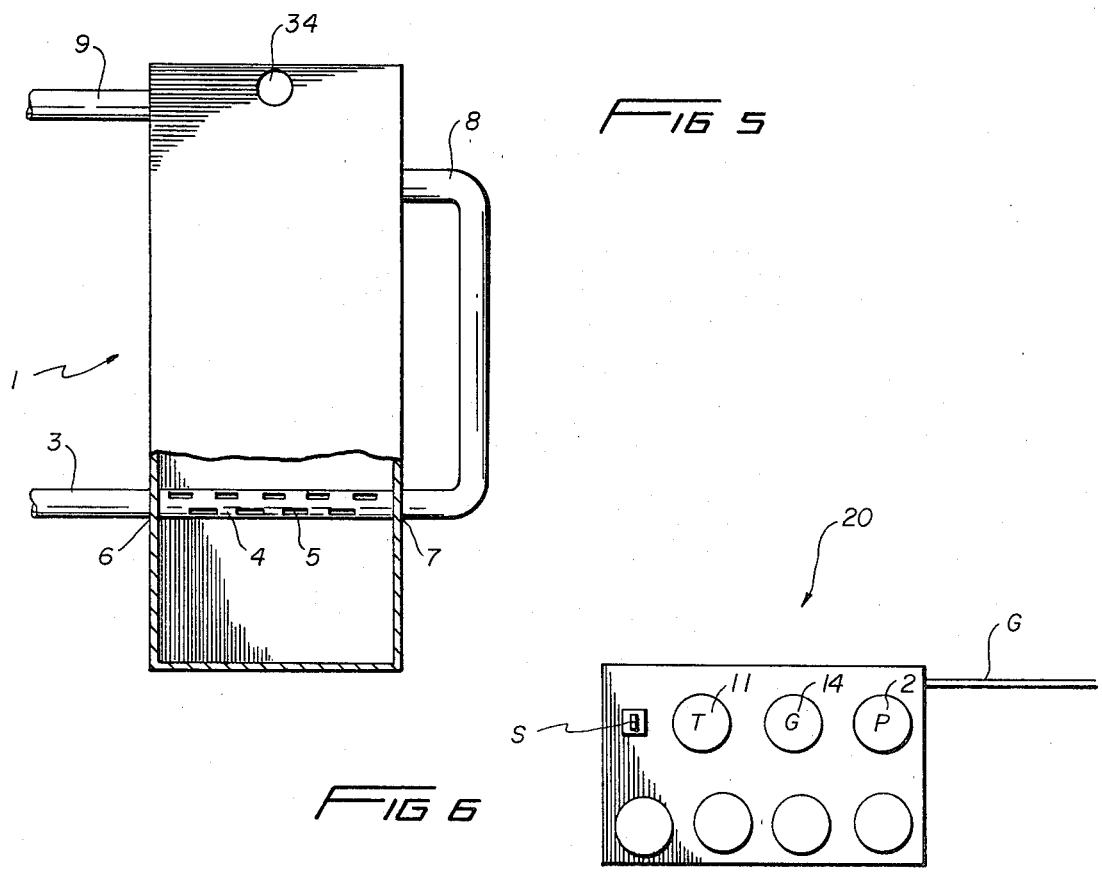

ELECTROLYSIS CHAMBER FOR HYBRID FUEL SYSTEM

BACKGROUND OF THE INVENTION

With rapidly rising fossil fuel prices along with the uncertainty of a continued supply of same, greater interest in alternative engery forms for vehicles and engines in general has been perceived.

Moreover, with the world getting seemingly smaller by the inexorable increase in world populations, civilization's awareness of a pollution free environment is at an all time high.

Whereas the attempts by engine manufacturers to date have focused primarily upon more accurately monitoring and atomizing a fuel charge within an internal combustion engine for example, and thereafter recirculating a portion of exhaust gases and treating the remaining exhausts gases by means of catalytic converters and the like, the instant application is directed to a device which minimizes the use of fossil fuel and uses therewith a fluid abundant in nature which, when the energy is extracted therefrom, provides pollution free by-products of the combustion, while at the same time improving engine performance and its associated life by not contaminating the lubricating system as by seepage, blowby, and the like.

OBJECTS AND SUMMARY OF THE INVENTION

Accordingly, this invention has as an object to provide a device which substantially minimizes the amount of fossil fuel required to run an engine.

In addition, this invention has as a further object to provide a device of the character described above which substantially decreases the pollution levels than that which has been experienced heretofore.

It is yet another object of this invention to provide a device of the character described above in which engine idling is improved and the operation of the engine is smoother during all speed ranges.

It is yet another object of this invention to provide a device of the character described above in which the lubricating oil commonly used in engines has a longer life due to the minimization of fouling of the lubrication by carbon build up, acids, and the like.

It is yet another object of this invention to provide a device of the character described above in which substantially complete combustion is effected so that subsequent treatment of the exhaust gases as by recirculation or catalyzing is no longer essential.

It is yet a further object of the invention to provide a device of the character described above in which the engine becomes more powerful and sensitive as well as responsive to the desires of the operator while simultaneously reducing carbon monoxide, hydro carbons and oxides of nitrogen in the environment.

It is another object of this invention to provide a device of the character described above in which the over all octane rating of the fuel associated with the given engine has risen to the point that knocking and pinging, commonly found in engines of today are substantially eliminated.

It is yet a further object of this invention to provide a device of the character described above in which engine maintenance costs have been considerably reduced by the use of cleaner burning fuels.

A further object contemplates providing a device of the character described above which can be retrofitted easily to existing engines, is relatively inexpensive to manufacture, safe to use and durable in construction.

These and other objects will be made manifest when considering the following detailed specification when taken in conjunction with the appended drawing figures.

BRIEF DESCRIPTION OF THE DRAWING FIGURES

FIG. 1 is a schematic view of the apparatus according to the present invention;

FIG. 2 is a partial view of that which is shown in FIG. 1 having a fragmentary portion of the electrolysis chamber displayed;

FIG. 3 is a view similar to FIG. 2 illustrating a second embodiment for the cathode and anode thereof;

FIG. 4 is a schematic representation illustrating a utilization of a plurality of systems according to the present invention;

FIG. 5 is a side view of the electrolysis chamber having a portion thereof removed for greater clarity;

FIG. 6 is a schematic representation of a control panel associated with the system for causing the system to cooperate with an existing engine;

FIG. 7 is a schematic depiction of one outer plate to be used with one embodiment according to the present invention;

FIG. 8 is a view similar to FIG. 7 showing the actual electrode in one form of the invention;

FIG. 9 shows a second form of the plating when contrasted with FIG. 7;

FIG. 10 is a sectional view taken along lines 10—10 of FIG. 3 showing the inner configuration of a second form of electrode; and FIG. 11 is a schematic depiction of another form of electrolysis chamber.

BRIEF DESCRIPTION OF THE PREFERRED EMBODIMENT

Referring to the drawings now, wherein like reference numerals refer to like parts throughout the various drawing figures, reference numeral 10 is directed to the hybrid fuel system according to the present invention.

The system 10 is provided with an electrolysis chamber means 1 that includes a cooling means 2, control means 20 for interfacing the hybrid fuel system 10 with a conventional engine, and means for introducing a fluid into the electrolysis chamber means 1 generally designated by pipes 3, 9, and conduit means extending from the electrolysis chamber means to the engine, generally denoted by reference numerals 28, 29 to introduce the electrolytically formed elemental components within the engine.

More specifically, the electrolysis chamber means 1 is shown as a substantially closed chamber having a lower inlet 6, outlet 7, through which a pipe 4 continuous with the pipe 3 but having apertures 5 thereon passes through. The fluid contained within the pipe 4 is allowed to be dispensed within the electrolysis chamber at a rate defined by the pumping rate of the pump 12 and the aperture size, and disposed directly above the pipe is a crotch portion 27 of a roof having an angle contour and plural faces 21, 22 such that electrodes are disposed substantially parallel to and below the faces of each roof area, the downward declination of the roof in conjunction with the crotch 27 being so arranged that the lower most portion of the roof is substantially parallel to the pipe 4 so that a natural barrier is formed whereby the elemental components of the fluid introduced to the electrolysis chamber will migrate along discrete faces of the roof and naturally avoid being recombined because of this physical barrier.

The area above the roof faces defines a cooling means 2 in which the lower portion is coincident with the roof component faces 21, 22 and FIG. 5 shows that a second portion of the fluid emitted from the pipe 4 passes through a pipe 8 into the upper cooling means area so that a liquid reservoir is thereby formed so as to control the temperature of the on going electrolysis. Excess fluid is discharged from pipe 9 back to a reservoir 13, and the temperature of the cooling fluid is monitored by the temperature gauge 11 which is to be displayed on the control means 20. The fluid reservoir 13 is provided with a liquid level gauge 14 to assure that the fluid is always in abundant supply, and that when replenishment of the fluid is necessary, this may be effected by means of the filler pipe 15.

The control means 20 includes an override switch S for manually disengaging the hybrid fuel system at the discretion of the operator bases on readings contained on the lower gauges for engine RPM and temperature, vehicle speed, and warning lights for malfunctioning systems, and conceivably the control system can display other useful information such as miles per gallon, time, etc.

The conduit means 28, and 29 are located on such a manner that the elemental components surrendered by the fluid due to electrolysis normally migrate to upper portions of the electrolysis chamber means 1, and to this purpose an orifice 34 is provided on either side thereof each communicating with respective conduits 28, 29 for scavenging these elemental components for admission into an engine. As shown in FIG. 1, the elemental components are routed, in one form of the invention to a carburetor C and discharged therein as through nozzle 38 for better atomization, or may be diverted for direct admission into the intake manifold M by means of conduits 39 extending thereto. The system when thus in operation, requires a substantially different gasoline requirement, and therefore the gas line G which extends to the carburetor can have its fluid flow rate altered by means of the control panel 20.

FIG. 4 shows a configuration for ganging plural electrolysis chamber means in series so that engines of various sizes and there associated machinery which the engine powers can be readily updated with this device. Specifically, the outlet area 7 of each chamber means 1 is connected to a second chamber means 1 by means of conduits 32 which ultimately revert to cooling means as shown in FIG. 5 by reference numeral 8 and thereafter the fluid returns to the reservoir 13 through pipe 9. The elemental components are scavanged by means of manifolds denoted by reference numeral 28, 29, 30 and 31, and these all terminate in either the carburetor or intake manifold as shown in FIG. 1.

Various cathodes and anodes can be used for the optimal disassociation of a fluid into its elemental components, and FIGS. 7, 8, and 9 teach the use of one specific form in which all three of these structures in combination correspond to reference numeral 24, FIG. 2. Specifically, a platinum electrode 37 is sandwiched between two foraminous plates 35 and 36 in which the plate 35 is shown as having plural apertures whereas the second plate 36 is shown as having a mesh or grid construction.

FIG. 10 shows an electrode preferably formed from carbon having a substantially cylindrical configuration with a centrally disposed axially aligned hole 39. The electrode 25, 26, 23 or 24 in a preferred formed is disposed parallel to a V-shaped roof and spaced therefrom, and the fluid emanating from the pipe 4 continuously washes the elemental components up the electrodes and to the outlet areas 34. A lowermost partition 33 or alternatively a second electrode on either side below the roof can be positioned to either serve as a guide or provide more rapid electrolysis.

An energy source 16 is provided to deliver the electrical potential difference between anode and the cathode, and in one form, the energy source can be a generator or alternator 16 which is drivably connected to a power take off on the engine, a drive train, axle, or the like (reference D) as is well known in the art. Moreover, the system can be selectively energized by means of a solenoid switch 17 which can further be overriden by means of control switch. As shown, the power source 16 is operatively connected to a terminal 18 for providing the electrical potential difference, while the other electrode is connected to a ground.

In use and operation, it is contemplated that the engine be initially started by means of its own previously existing fuel source, and after certain temperature/speed requirements have been met, the electrical potential is applied to the cathodes and anodes so as to cause an electrolysis process to occur. The control consol will then start fluid to be pumped from the reservoir 13 into the electrolysis chamber 1 which fluid thereafter is broken down into its elemental components providing these components to the engine based on demand by the vacuum created in the normal engine process at which time the use of traditional fuel can be decreased at the option of the engine operator or the control system. Excess fluid after passing through the cooling chamber 2 returns back to the reservoir for recirculation.

It should be apparent that numerous fluids can be utilized in this apparatus the liquid water being one example. A preferred mixture of fluid which provides ready disassociation comprises the following residue combinations or variations:

$H_2O$ + Acids $H_2O$ + Bases $H_2O$ + Salts $H_2O$ + Oxides $H_2O$ + Irons $H_2O$ + Any material that will ionize $H_2O$ may be distilled and or ionized.

The preferred percentages of the additive can be anywhere from one part per 1000 up to 100%. The preferred ratio for optimum disassociation is 50% $H_2O$ and 50% additive.

FIG. 11 teaches the use of a further embodiment on which a partition 50 comprises a semipermeable membrane suitably dimensional to exclude the constituent components from reassembly, as is sometimes found in dialysis preferably formed from a fiberglass panel.

Moreover, having thus described the invention, it should be apparent that numerous structural modifications are contemplated as being part of this invention as set forth hereandabove and as defined hereandbelow by the claims.

What is claimed is:

1. A hybrid fuel system for an engine which normally operates on fuel such as gasoline, kerosene, propane or the like and to be used in conjunction therewith comprising in combination:
   an electrolysis chamber means including cooling means,
   means for introducing a fluid into said electrolysis chamber means for disassociation of said fluid into its elemental components,
   and control means for varying the ratio of the fuel to said elemental components,
   wherein said electrolysis chamber means comprises: a fluid inlet and outlet, a pipe extending through said electrolysis chamber means at said inlet and to said outlet having plural apertures therethrough to allow migration of a first portion of said fluid into an electrolysis area of said electrolysis chamber means from said pipe, a second portion of said fluid is used as a heat transfer medium for said cooling means.

2. The device of claim 1 wherein said electrolysis area is defined by a downwardly angled roof overlying said pipe having anode and cathode means spaced apart therebelow on separate faces of said roof whereby a crotch lower portion of said roof over said pipe serves as a divider to keep separate said elemental components.

3. The device of claim 2 wherein said conduit means gathers said elemental components through conduit inlets disposed at top areas of said separate faces of said roof whereby said elemental components migrate upwardly along said anode and cathode means into said conduit means.

4. The device of claim 3 wherein said electrolysis chamber means includes energy to disassociate said fluid into its elemental components said energy is derived from an alternator operatively connected to said cathode means and anode means and said alternator is operatively driven.

5. The device of claim 4 wherein said anode and cathode means are formed from carbon tubes.

6. The device of claim 4 wherein said anode and cathode means are formed from a laminate defined by foraminous outer plating and a platinum inner foil.

7. The device of claim 4 wherein said cooling means comprises a fluid reservoir disposed above said roof filled by said second portion of fluid and discharged to a storage tank for recirculation through said pipe through an interposed pump.

8. The device of claim 4 wherein said fluid comprises water and an ionization additive in the preferred ratio ranges of 50—50 for optimum disassociation.

* * * * *